Aug. 19, 1941.  E. L. SCHOFIELD  2,253,141
RESILIENT ROLLER AND MOUNTING THEREFOR
Original Filed Nov. 21, 1938
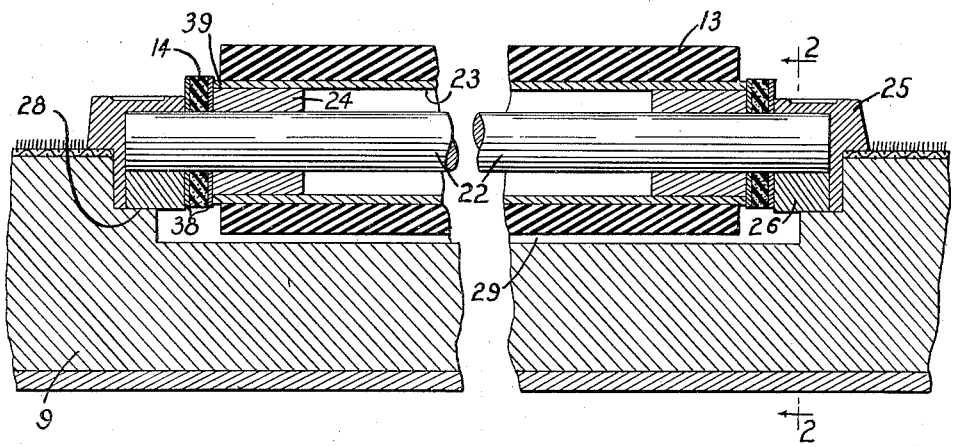
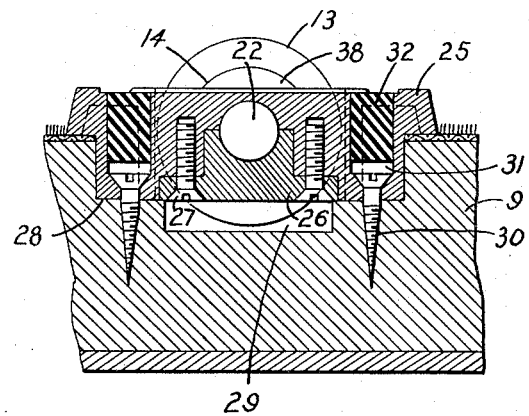
Inventor:
Earl L. Schofield
By McCanna, Wintercorn & Morsbach
Attys.

Patented Aug. 19, 1941

2,253,141

UNITED STATES PATENT OFFICE 2,253,141

RESILIENT ROLLER AND MOUNTING THEREFOR

Earl L. Schofield, Freeport, Ill., assignor to Henney Motor Company, Freeport, Ill., a corporation of Delaware Original application November 21, 1938, Serial No. 241,501. Divided and this application March 13, 1939, Serial No. 261,449

11 Claims. (Cl. 193—37)

This application is a division of my copending application Serial No. 241,501, filed November 21, 1938, which application is a continuation in part of my earlier application Serial No. 107,259, filed October 23, 1936.

The principal object of my invention is to provide a rubber roller and mounting therefor, which, while especially designed and intended for use in hearses for noiseless support, as well as elimination of side movement of a casket and the cushioning of road shocks otherwise transmitted to the casket while the hearse is in motion, may be used for other purposes in the general art of conveying.

Another important object is the provision of rubber rollers which include in the mountings therefor softer or sponge rubber cushioning means at the opposite ends thereof permitting the rollers to give easily endwise to absorb and cushion sidewise motion of the article passing over the same, whereby to avoid likelihood of any squealing sound.

The invention is illustrated in the accompanying drawing, in which—

Fig. 1 is a longitudinal section through one of the rollers and its mounting, made in accordance with my invention, and Fig. 2 is a cross-section on the line 2—2 of Fig. 1.

The same reference numerals are applied to corresponding parts in these two views.

The numeral 9 designates a casket table for a side delivery hearse, but may be regarded, generally speaking, as any suitable support for the resilient roller of my invention, indicated by the numeral 13. Rollers of this kind when used in a hearse are provided in pairs in laterally spaced relation, usually six pairs on a table in longitudinally spaced relation. These rollers are all of rubber of a predetermined softness to support the casket for smooth and quiet movement onto and off the table and also against skidding or drifting laterally from a given position, as, for example, when the hearse makes a sharp turn at higher speed than usual or assumes a position of unusual sidewise inclination due to the high crown of a street. The rubber I prefer using is preferably black and what is called "non-blooming" and has a minimum tensile strength of 2500 pounds per square inch, minimum elongation of 600%, and Shore hardness of 45–55. The rubber is molded to tubular form and bonded to tubular steel cores 23 by vulcanizing, the cores being brass plated to insure a good bond with the rubber. While a different size and thickness might be used, I prefer to have the rubber approximately one-fourth inch thick where the diameter of the roller is an inch and a half. The rollers are preferably ten inches long and are purposely spaced laterally with respect to one another for engagement by the longitudinal wooden cleats provided on the bottoms of caskets. The dimensions will, of course, vary according to the uses to which the rollers may be put, and the same is true with regard to the rubber specifications, the rubber specified having been found especially suitable where the rollers are used on a casket table.

These rollers, in accordance with my invention, are also equipped with special softer or sponge rubber end thrust bearings 14 to cushion sidewise motion of the rollers. This is of advantage in eliminating any tendency toward chattering if there happens to be a certain amount of lateral movement of the object being passed over the rollers, and in that way there is no danger of a squealing noise. The rubber bearings 14 also absorb shocks incident to movement of the support 9 or the object resting on the rollers 13, thereby further reducing any likelihood of the object moving sidewise with respect to the rollers from a given position.

The tubular steel cores 23 in the rollers 13 have bushings entered with a press fit in the opposite ends thereof to receive axles 22 on which the rollers turn rather freely. The axles in the case of all of the intermediate rollers of the table are mounted in rectangular plates 25, with some end plates 26 fastened in place with screws 27 from beneath serving to clamp the ends of the axle. The table is recessed, as at 28, to accommodate the plate 25, and recessed still deeper, as at 29, to accommodate the roller 13. Screws 30 fasten the plate 25 in place and are entered in holes 31 which are filled with rubber plugs 32, which, being black to match the finish of the top of the plate 25, are not at all noticeable.

The end thrust bearings 14, previously mentioned, are of molded sponge rubber and are in the form of washers, as indicated in Fig. 1, assembled on the axles 22 at opposite ends of the rollers. Each of these soft rubber washers is protected and backed up on both sides by metal washers 38. The ends of each core 23 project beyond the ends of the rubber covering as indicated at 39 and have the outer ends of the bushings 24 disposed flush therewith so that broad flat bearing surfaces are provided for low frictional engagement with the metal washers 38 and the rubber covering will not rub on these parts and set up friction drag upon rotation of the roller.

I claim:

1. In a roller support, roller means for supporting an article for movement relative to said support comprising an elongated axle mounted on said support, a non-yielding elongated roller body comprising a main elongated tubular body member having bushings non-rotatably mounted in the opposite ends thereof and bearing rotatably on the axle whereby said roller body is rotatably supported on said support, a soft rubber covering on said tubular body member terminating in spaced relation to the ends thereof, said roller being movable endwise with respect to said axle, and resilient means concentric with the axle and bearing against opposite ends of the roller body to resist endwise movement thereof with respect to said support.

2. In a hearse comprising a casket support, roller means for supporting a casket for movement relative to said support comprising an elongated axle mounted on said support, a non-yielding elongated roller body comprising a main elongated tubular body member having bushings non-rotatably mounted in the opposite ends thereof and bearing rotatably on the axle whereby said roller body is rotatably supported on said casket support, a soft rubber covering on said tubular body member terminating in spaced relation to the ends thereof, said roller being movable endwise with respect to said axle, sponge rubber washers encircling the axle adjacent opposite ends of the roller body to resist endwise movement of said roller with respect to said casket support, and metal washers encircling the axle adjacent opposite ends of the roller having sliding engagement with the ends of the roller body and serving to transmit pressure from the roller to the sponge rubber washers.

3. As an article of manufacture, a resilient supporting roller comprising an elongated tubular metallic core, an elongated tubular rubber body surrounding said core, bearing members entered in opposite ends of said core and adapted to receive a supporting axle, a supporting axle inserted therethrough and projecting from the ends of the roller for support of the roller on a suitable support, and rings of sponge rubber surrounding the axle at opposite ends of the roller and arranged to be compressed between the roller and the support upon endwise movement of the roller relative to the support.

4. As an article of manufacture, a resilient supporting roller comprising an elongated tubular metallic core, an elongated tubular rubber body surrounding said core, bearing members entered in opposite ends of said core and adapted to receive a supporting axle, a supporting axle inserted therethrough and projecting from the ends of the roller for support of the roller on a suitable support, rings of sponge rubber surrounding the axle at opposite ends of the roller, and metallic washers for backing up said rings also surrounding the axle at opposite ends of the roller, the sponge rubber rings being compressible upon endwise movement of the roller relative to the support.

5. In combination, a roller adapted for rolling and stationary support of a casket in a hearse, said roller adapted to be mounted in a depression in a support, a supporting axle for said roller, a rectangular plate surrounding the depression and arranged to support the roller by its axle, end plates secured to the bottom of said plate at opposite ends and having clamping engagement with the ends of the axle, whereby the axle is clamped between the first plate and the end plates, the first plate having holes provided therein and the bottom of said holes being defined by walls in turn having screw holes provided therein, screws entered through said holes for fastening the first plate to the support, and plugs removably entered in the holes in said plate flush with the top thereof and serving to conceal said screws.

6. In a roller support, roller means for supporting an article for movement relative to said support comprising an elongated axle mounted on said support, a non-yielding elongated roller body rotatably mounted on the axle whereby the roller body is rotatably supported on the support, a soft rubber covering on said roller body, the roller body being movable endwise with respect to the axle, and resilient means concentric with the axle and bearing against opposite ends of the roller body to resist endwise movement thereof with respect to the support.

7. In a roller support, roller means for supporting an article for movement relative to said support comprising an elongated axle mounted on said support, a non-yielding elongated roller body rotatably mounted on the axle whereby the roller body is rotatably supported on the support, a soft rubber covering on said roller body, the roller body being movable endwise with respect to the axle, sponge rubber washers encircling the axle adjacent opposite ends of the roller body to resist endwise movement thereof with respect to the support, and metal washers encircling the axle adjacent opposite ends of the roller body and having sliding engagement with the ends of said roller body to transmit pressure from the roller body to the sponge rubber washers in the endwise movement of the roller body with respect to the support.

8. A structure as set forth in claim 6, wherein the soft rubber covering terminates in spaced relation to the ends of the roller body, whereby the resilient means is contacted only by the roller body.

9. A structure as set forth in claim 7, wherein the soft rubber covering terminates in spaced relation to the ends of the roller body, whereby the metal washers are contacted only by the ends of said body.

10. In a hearse comprising a casket support, roller means for supporting a casket for movement relative to said support, comprising an elongated axle mounted on said support, a non-yielding elongated roller body mounted on the axle for rotation relative to the support, a soft rubber covering on said roller body, the roller body being movable endwise with respect to the support, and resilient means cooperating with the axle and roller body to resist endwise movement of the roller body with respect to said support.

11. In a hearse comprising a casket support, roller means for supporting a casket for movement relative to said support, comprising an elongated axle mounted on said support, an elongated roller mounted on the axle for rotation relative to the support, the roller being movable endwise with respect to the support, and resilient means cooperating with the axle and roller to resist endwise movement of the roller with respect to said support.

EARL L. SCHOFIELD.